(12) United States Patent
Apold et al.

(10) Patent No.: US 10,279,442 B2
(45) Date of Patent: May 7, 2019

(54) ROBOT WITH TOOL FOR TRACKING ADJUSTMENT

(71) Applicant: GM GLOBAL TECHNOLOGY OPERATIONS LLC, Detroit, MI (US)

(72) Inventors: Judith Apold, Ruesselsheim (DE); Hans Jürgen Walther, Ruesselsheim (DE); Achim Nold, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 189 days.

(21) Appl. No.: 15/383,810

(22) Filed: Dec. 19, 2016

(65) Prior Publication Data
US 2017/0173746 A1 Jun. 22, 2017

(30) Foreign Application Priority Data
Dec. 18, 2015 (DE) .................... 20 2015 008 713 U

(51) Int. Cl.
| | |
|---|---|
| *B23P 19/06* | (2006.01) |
| *B25J 11/00* | (2006.01) |
| *B25J 15/00* | (2006.01) |
| *B25J 19/02* | (2006.01) |

(52) U.S. Cl.
CPC ............. *B23P 19/06* (2013.01); *B25J 11/005* (2013.01); *B25J 15/0019* (2013.01); *B25J 15/0052* (2013.01); *B25J 19/023* (2013.01); *Y10S 901/41* (2013.01)

(58) Field of Classification Search
CPC ...... B23P 19/06; B25J 11/005; B25J 15/0019; B25J 15/0052; B25J 19/023; Y10S 901/41

USPC ......................................................... 81/57.32
See application file for complete search history.

(56) References Cited

U.S. PATENT DOCUMENTS

| | | | | |
|---|---|---|---|---|
| 3,535,960 A | * | 10/1970 | Borries ................. | B25B 21/002 81/57.14 |
| 4,679,327 A | | 7/1987 | Fouchey et al. | |
| 5,040,303 A | * | 8/1991 | Koerner ................. | G01B 7/315 33/203 |
| 6,163,946 A | | 12/2000 | Pryor | |

(Continued)

FOREIGN PATENT DOCUMENTS

| | | |
|---|---|---|
| CN | 2428381 Y | 5/2001 |
| FR | 2677445 A1 | 12/1992 |

(Continued)

OTHER PUBLICATIONS

German Patent Office, German Search Report for German Application No. 202015008713.2, dated Aug. 11, 2016.

(Continued)

*Primary Examiner* — Hadi Shakeri
(74) *Attorney, Agent, or Firm* — Lorenz & Kopf, LLP

(57) ABSTRACT

A robot includes a movable robot arm, at least one actuator for moving the robot arm, and a tool attached to the robot arm for adjusting the track of a wheel by turning of a track rod of a motor vehicle. The tool includes a tool head and a tool handle connecting the tool head to the robot arm. The tool head has a slot-shaped opening in a distal end, which is remote from the robot arm, for introducing a track rod with a thickness that is less than or equal to 20%, and preferably less than and equal to 15% of the tool head from the distal end to the connection to the tool handle.

19 Claims, 3 Drawing Sheets

(56) References Cited

U.S. PATENT DOCUMENTS

| | | | |
|---|---|---|---|
| 6,308,593 B1 * | 10/2001 | Shibayama | B25B 17/00 81/57.4 |
| 7,357,053 B2 * | 4/2008 | Doan | G01B 5/255 81/57.14 |
| 8,082,822 B2 | 12/2011 | Hoenke | |
| 8,301,302 B2 | 10/2012 | Sarh et al. | |
| 8,322,255 B1 | 12/2012 | Jordan et al. | |
| 8,443,503 B2 | 5/2013 | Park | |
| 2007/0289151 A1 | 12/2007 | Doan | |
| 2011/0106311 A1 | 5/2011 | Nakajima et al. | |

FOREIGN PATENT DOCUMENTS

| | | |
|---|---|---|
| JP | 2000289640 A | 10/2000 |
| JP | 2004017907 A | 1/2004 |
| KR | 20020052268 A | 7/2002 |
| WO | 2008063212 A2 | 5/2008 |
| WO | 2014081573 A1 | 5/2014 |

OTHER PUBLICATIONS

Fori Automation Inc., Robotic toe set with vision placement, Aug. 2013, http://www.foriauto.com/Portals/0/End%20of%20Line.pdf.
Jong-Eun Ha, Wang-Heon Lee, Automatic Manipulation of Tie Rod using Robot with 3D Sensing System, Sep. 6, 2014, http://www.jeet.or.kr/LTKPSWeb/pub/pubfpfile.aspx?ppseq=1121.
Paul Studebaker, From touch to feel sensors, Jan. 13, 2014, http://www.controldesign.com/articles/2014/from-touch-to-feel-sensors/.

* cited by examiner

ROBOT WITH TOOL FOR TRACKING ADJUSTMENT

CROSS-REFERENCE TO RELATED APPLICATION

This application claims priority to German Patent Application No. 202015008713.2, filed Dec. 18, 2015, which is incorporated herein by reference in its entirety.

TECHNICAL FIELD

The present invention relates to a robot with a tool for tie rod adjustment.

BACKGROUND

The steered wheels of motor vehicles each exhibit a tie rod for steering. The track of the wheels, i.e., the alignment of the two steered, opposing wheels on the motor vehicle, can be adjusted by turning a tie rod. It is here required that the two wheels be aligned parallel to each other. A hexagon is formed on the tie rod, and this hexagon can be used to apply a torque to the tie rod in order to turn the tie rod and change the track of the wheel allocated to this tie rod. A threaded section of the tie rod exhibits an external thread, and this external thread is screwed onto a bearing head with an internal thread, as a result of which turning the tie rod changes the track of the wheel. The bearing head is normally fastened to a steering arm for swiveling the steered wheel.

Before turning the tie rod, it is first necessary to loosen a lock or counter nut, and then turn the tie rod to change the track, after which the lock nut must again be tightened so that the correspondingly changed track remains unchanged during motor vehicle operation.

Known from U.S. Pat. No. 8,082,822 B2 is a robot with a movable robot arm. A tool for setting the track of a wheel is fastened to the robot arm. The tool encompasses a first mechanical actuating member for turning the tie rod, and a second mechanical actuating member for turning the lock nut.

SUMMARY

The object of the invention is to provide a robot with a tool for tie rod adjustment in which the tie rod can be easily set, wherein the tool is inexpensive to manufacture.

In an embodiment, this object is achieved in a robot comprising a movable robot arm, at least one actuator for moving the robot arm, a tool fastened to the robot arm for setting the track of a wheel by turning a tie rod of a motor vehicle, wherein the tool encompasses a tool head and tool shaft, which joins the tool head with the robot arm, wherein the front end of the tool head remote from the robot arm exhibits a slotted opening for introducing a tie rod as well as a thickness d, wherein the thickness d measures at most about 20%, preferably at most 15%, of the length 1 of the tool head from the front end to where connected to the tool shaft. In other words, the tool head is an approximately disk-shaped part, which based on its outer geometry can, guided by the robot arm, be introduced into the narrow, poorly accessible part of a motor vehicle in which the tie rod is mounted.

In an embodiment, the tool encompasses a first mechanical actuating member that can be turned around a first rotational axis for turning the tie rod, and a second mechanical actuating member that can be turned around a second rotational axis for turning a lock nut on the tie rod, wherein the first mechanical actuating member exhibits a first contact surface for placement on a positive geometry of the tie rod, wherein a main part of the first contact surface of the first mechanical actuating member is fixed in design in terms of a radial movement relative to the remaining tool and/or relative to the first rotational axis. The first contact surface of the first mechanical actuating member forms a counter-positive geometry, and the geometry of the first contact surface is essentially designed complimentarily to the geometry of a positive geometry on the outside of the tie rod. As a result, a torque can be positively applied from the first contact surface of the main part to the positive geometry on the tie rod. A main part, meaning a greater part, of the first contact surface can here not be moved radially relative to the first rotational axis as a longitudinal axis of the first mechanical actuating member. As a result, the first mechanical actuating member can advantageously be built and fabricated in an especially easy manner from a structural standpoint, in addition to which the torque can be especially reliably transferred from the first actuator, i.e., the first contact surface on the first mechanical actuating member, to the positive geometry on the tie rod during robot operation. Turning involves a rotational movement around a rotational axis.

In an additional embodiment, the first mechanical actuating member and second mechanical actuating member are built into just a single tool. As a rule, the just one single tool exhibits a shared housing, and is fastened to a, in particular just one, robot arm of the robot. A movement of the robot arm thereby forces an identical movement of both the first and second mechanical actuating members.

In a supplemental variant, the first mechanical actuating member is configured so as to preclude a radial movement by the main part of the first contact surface relative to the remaining tool and/or relative to the first rotational axis.

It is best for the main part of the first contact surface to be essentially U-shaped in design, with a counter-positive geometry for positively applying a torque to a positive geometry of the tie rod.

In an additional embodiment, the counter-positive geometry of the main part of the first contact surface is designed as a square for applying the torque.

In a supplemental embodiment, the main part of the first contact surface of the first mechanical actuating member is designed on a partial ring with an opening for introducing the positive geometry of the tie rod, and an interior side of the partial ring forms the main part of the first contact surface.

In a supplemental variant, the main part of the first contact surface of the first mechanical actuating member encompasses at least 50% or 60% of the first contact surface. A greater part of the first contact surface of the first mechanical actuating member is thus comprised of the main part of the first contact surface on the partial ring.

An additional part of the first contact surface of the first mechanical actuating member is preferably moveable in design in terms of a radial movement relative to the first rotational axis and/or movable relative to the main part of the first contact surface, in particular the additional part of the first contact surface is comprised of two movable connecting pieces. The additional part of the first contact surface is thus the first contact surface minus the main part of the first contact surface of the first mechanical actuating member. However, the additional part of the first contact surface can also be formed on just a single component, for example an additional contact component, for example by designing the two connecting pieces as a single piece as an additional contact component. The additional part of the first contact surface preferably encompasses less than 50% or 40% of the entire first contact surface. The first contact surface is thus divided into the main part and additional part.

In a supplemental variant, the tool encompasses at least one actuator and preferably at least one mechanism for turning the first mechanical actuating member around the first rotational axis and/or turning the second mechanical actuating member around the second rotational axis. For example, the at least one actuator is an electric motor, a pneumatically driven actuator or a hydraulically driven actuator. As a rule, the mechanism encompasses at least one gear for turning the first and/or second mechanical actuating member, i.e., for imparting a rotational movement of the first and/or second mechanical actuating member around the first and/or second rotational axis.

In an additional embodiment, exclusively a rotational movement around the first rotational axis can be performed by the main part of the first contact surface and/or the partial ring, or no translational movement relative to the remaining tool can be performed by the main part of the first contact surface and/or the partial ring.

In an additional embodiment, the first mechanical actuating member and second mechanical actuating member are designed coaxially to each other. The first and second mechanical actuating members are aligned coaxially to each other, i.e., have an essentially identical longitudinal axis or rotational axis. The longitudinal axis of the first mechanical actuating member is the first rotational axis, and the longitudinal axis of the second mechanical actuating member is the second rotational axis.

In an additional variant, the first rotational axis and second rotational axis are essentially identical. The first and second rotational axes thus exhibit a distance of less than 5 mm, 4 mm, 3 mm, 2 mm or 1 mm, and/or the first and second rotational axes are aligned parallel to each other.

In an additional embodiment, a main part of the second contact surface of the second mechanical actuating member is fixed in design in terms of a radial movement relative to the remaining tool and/or relative to the second rotational axis. The second mechanical actuating member is designed similarly to the first mechanical actuating member, and differs from the first mechanical actuating member only in that the radial distance from the second rotational axis to the second contact surface is larger than the radial distance from the first rotational axis to the first contact surface. The radial distance between two points on the first contact surface is thus larger than the radial distance between two points on the second contact surface given a similar alignment of points on the first contact surface and on the second contact surface according to the geometry of the first contact surface and the second contact surface. This is necessary because the diameter of the positive geometry of the lock nut is larger than the diameter of the positive geometry of the tie rod.

In a supplemental variant, the second mechanical actuating member is designed so as to preclude a radial movement by the main part of the second contact surface relative to the remaining tool and/or relative to the second rotational axis.

It is best that the main part of the second contact surface be essentially U-shaped in design, with a counter-positive geometry for positively applying a torque to a positive geometry of the lock nut.

In an additional embodiment, the counter-positive geometry of the main part of the second contact surface is designed as a square for applying the torque.

In a supplemental configuration, the main part of the second contact surface of the second mechanical actuating member is designed on a partial ring with an opening for introducing the positive geometry of the lock nut, and an interior side of the partial ring forms the main part of the second contact surface.

In a supplemental variant, the main part of the second contact surface of the second mechanical actuating member encompasses at least 50% or 60% of the second contact surface. A greater part of the second contact surface of the second mechanical actuating member is thus comprised of the main part of the second contact surface on the partial ring.

An additional part of the second contact surface of the first mechanical actuating member is preferably moveable in design relative to the main part of the second contact surface, in particular the additional part of the second contact surface is comprised of two movable connecting pieces. The additional part of the second contact surface is thus the second contact surface minus the main part of the second contact surface of the second mechanical actuating member. The additional part of the second contact surface can also be formed on just a single component, for example by designing the two connecting pieces as a single piece.

In an additional embodiment, the robot encompasses a control unit for controlling the movement of the robot arm and/or for actuating the tool.

In a supplemental variant, the robot encompasses an optical system with a camera for optically acquiring the position of the lock nut and/or tie rod.

It is best that the additional part of the first contact surface be designed on a first component, in particular a first additional contact component, and that a rotational movement around the first rotational axis can be imparted to the first component in a closed position together with the partial ring of the first mechanical actuating mechanism. In the closed position of the first component, the additional part of the first contact surface rests on the positive geometry of the tie rod if the tie rod is located inside of the opening on the partial ring. In the open position of the component, the tie rod and/or lock nut can be moved through the opening on the housing and the opening on the partial ring. The first component consists of one or several parts. The first component can preferably be moved between the closed position and open position and vice versa by means of an actuator, and preferably a mechanism.

It is best that the additional part of the second contact surface be designed on a second component, in particular a second additional contact component, and that a rotational movement around the second rotational axis can be imparted to the second component in a closed position together with the partial ring of the second mechanical actuating mechanism. In the closed position of the second component, the additional part of the second contact surface rests on the positive geometry of the lock nut if the lock nut is located inside of the opening on the partial ring. In the open position of the component, the tie rod and/or lock nut can be moved through the opening on the housing and the opening on the partial ring. The second component consists of one or several parts. The second component can preferably be moved between the closed position and open position and vice versa by means of an actuator, and preferably a mechanism.

In an additional configuration, the robot encompasses a measuring system for acquiring the position of the wheels of the motor vehicle, and the control unit can be used to calculate the required rotational angle of the tie rod as a function of the acquired position of the wheels, i.e., of the steered wheels of the motor vehicle, so as to correctly set the track of the wheels.

In an additional embodiment, the first and/or second mechanical actuating member is designed out of metal, in particular steel.

BRIEF DESCRIPTION OF THE DRAWINGS

An exemplary embodiment of the invention will be described in more detail below with reference to the attached drawings. Shown on.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
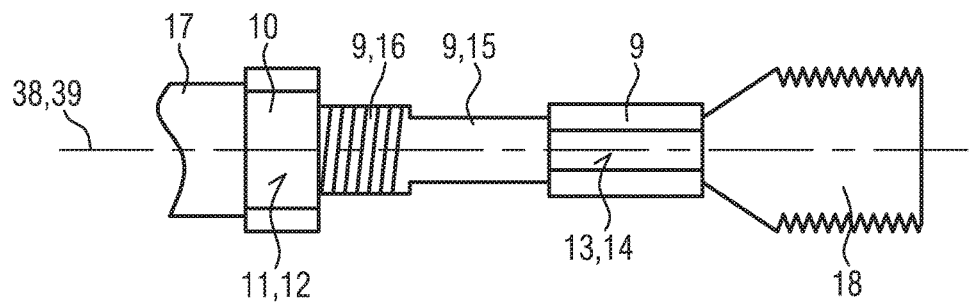
FIG. 1 is a view of a tie rod with lock nut.
Figure 2:
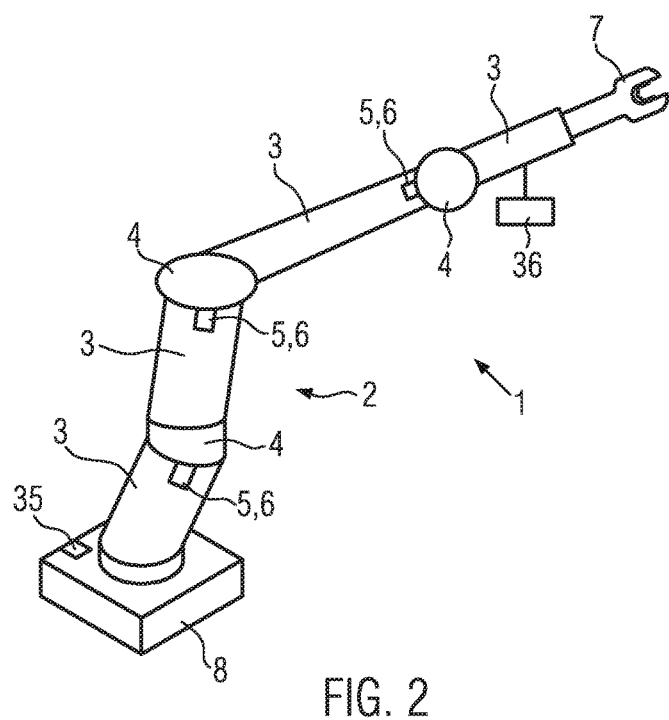
FIG. 2 is a perspective view of a robot.

A motor vehicle (not shown) exhibits two steered front wheels. The force necessary for steering is applied to the wheels by means of a tie rod 9. To this end, the two tie rods 9 of the motor vehicle are joined with a steering gear (not shown) for moving the tie rods 9 in essentially the transverse direction of the motor vehicle. The tie rod 9 (FIG. 1) encompasses a threaded section 16 in the area of the wheel, a neutral section 15 and a positive geometry 13 as a hexagon 14 in proximity to the steering gear (not shown). An extension of the tie rod 9 not depicted on FIG. 1 is arranged inside of a covering hose 18, and joined with the steering gear. The threaded section 16 of the tie rod 9 is screwed into a bearing head 17, and the bearing head 17 exhibits a borehole with an internal thread. The threaded section 16 of the tie rod 9 is screwed into this internal thread on the borehole of the bearing head 17. The bearing head 17 is hinged by means of a steering arm with the wheel of the motor vehicle.

A robot 1 exhibits a robot arm 2, which consists of several members 3. The members 3 of the robot arm 2 are joined together by hinges 4, and the individual members 3 can be moved toward each other on the hinges 4 by means of actuators 5 as the electric motors 6. The lowermost member 3 of the robot arm 2 is fastened to a floor part 8, and the floor part 8 rests on a floor or is secured thereto. Another end of the robot arm 2 exhibits a fastener for fastening a tool 7, and the tool 7 is fastened to the end section of the robot arm 2 with this fastener. A control unit 35 serves to control the movement of the robot arm 2, i.e., to control the actuators 5 and activate the tool 7. A camera 36 on the end region of the robot arm 2 optically acquires the tie rod 9 as well as a lock nut 10 or counter nut 10, so that the optical data acquired by the camera 6 and the optical data of the camera 36 evaluated by the control unit 35 can resultantly be used to perform a targeted movement of the tool 7 into the corresponding positions on the tie rod 9 and lock nut 10. The outside of the lock nut 10 exhibits a positive geometry 11 as a hexagon 12 (FIG. 1), so that the hexagon 12 on the lock nut 10 can be used to turn the lock nut 10, i.e., impart a rotational movement around a first rotational axis 38 to it. This makes it possible to fix and detach the lock nut 10.

Figure 3:
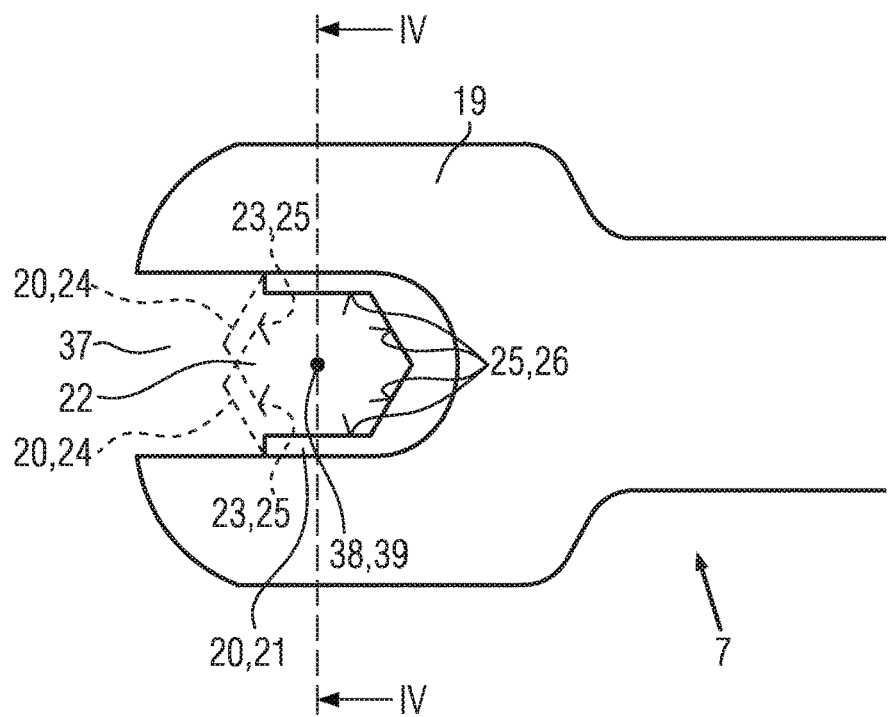
FIG. 3 is a side view of a schematically depicted tool on the robot.
Figure 4:
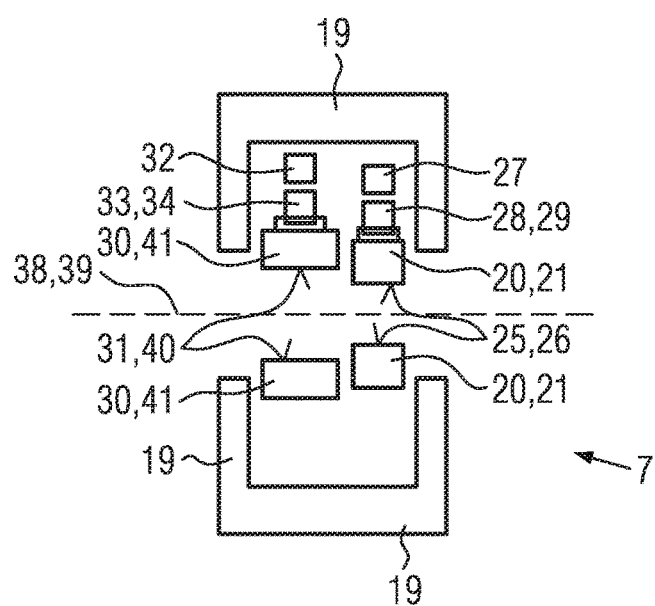
FIG. 4 is a highly simplified cross section IV-IV according to FIG. 3 through the tool.

The tool 7 exhibits a housing 19, and the housing 19 incorporates a first mechanical actuating member 20 for turning the tie rod 9, and a second mechanical actuating member 30 for turning the lock nut 10. The first mechanical actuating member 20 encompasses a partial ring 21 with an opening 22 and two connecting pieces 24. An interior side of the partial ring 21 and the interior sides of the connecting pieces 24 form a first contact surface 25 for placement on the positive geometry 13 on the outside of the tie rod 9. The geometry of the first contact surface 25 as a counter-positive geometry is here designed complementarily to the positive geometry 13 on the tie rod 9, so that, by turning the first mechanical actuating member 20 around the first rotational axis 38 based on a positive connection between the first contact surface 25 of the first mechanical actuating member 20 and the positive geometry 13 on the tie rod 9, a torque can thereby be applied to the tie rod 9, as a result of which the tie rod 9 can be turned around the first rotational axis 38, i.e., a rotational movement around the first rotational axis 38 can be imparted thereto. This makes it possible to turn the tie rod 9 and set the track of the wheel. The partial ring 21 exhibits the opening 22, and the housing 19 further also exhibits an opening 37. The two connecting pieces 24 can be moved with an actuator (not shown) and preferably a mechanism, and FIG. 3 presents a closed position of the two connecting pieces 24 with dashed lines for turning the tie rod 9. In this closed position of the connecting pieces 24, the connecting pieces 24 also comprise an additional part 23 of the first contact surface 25. In an open position (not shown) of the connecting pieces 24, the additional part 23 of the first contact surface 25 cannot be used for turning the tie rod 9, and the connecting pieces 24 are at least partially situated inside of the housing 19. While turning the tie rod 9 with the first mechanical actuating member 20, the connecting pieces 24 are also in the closed position, meaning that the additional part 23 of the first contact surface 25 along with the main part 26 on the partial ring 21 of the first mechanical actuating member 20 lie on the positive geometry 13 of the tie rod 9. The first mechanical actuating member 20, i.e., the partial ring 21 and the two connecting pieces 24, can be turned around the first rotational axis 38 by an actuator 27 as the electric motor and a mechanism 28. The mechanism 28 encompasses at least a gear wheel 29 for applying a torque to the first mechanical actuating member 20.

The tool 7 also encompasses a second mechanical actuating member 30 for turning the lock nut 10. The second mechanical actuating member 30 has a structural design similar to the first mechanical actuating member 20, i.e., exhibits a partial ring 41 and (not shown) movable connecting pieces 24. The main part 40 of a second contact surface 31 of the second mechanical actuating member 30 is formed on the partial ring 41 of the second mechanical actuating member 30, and the additional part (not shown) of the second contact surface 31 is provided on the inside of the connecting pieces 24 (not shown). The second mechanical actuating member 30 can be turned around a second rotational axis 39 by means of an actuator 32 and a mechanism 33 with at least one gear wheel 34, similarly to the first mechanical actuating member 20. The first and second mechanical actuating members 20, 30 only differ in terms of the diameter between the two contact surfaces 25, 31. The lock nut 10 has a larger diameter on the positive geometry 11, i.e., on the hexagon 12, than the tie rod 9 does on the positive geometry 13, so that the first contact surface 25 of the first mechanical actuating member 20 also exhibits a smaller diameter than the second contact surface 31 of the second mechanical actuating member 30.

In order to set the track of the wheels of the motor vehicle, the connecting pieces 24 of the first mechanical actuating member 20 are first situated in an open position (not shown) inside of the housing 19, so that the opening 22 on the partial ring 21 of the first mechanical actuating member 20 is thereby open, and the connecting pieces (not shown) of the second mechanical actuating member 30 are simultaneously located inside of the housing 19. As a result, the neutral section 15 of the tie rod 9 can be introduced into the opening 37 on the housing 19, and then simultaneously introduced into the opening 22 on the partial ring 21 of the first mechanical actuating member 20 and into the opening on the partial ring 41 of the second mechanical actuating member 30 until the two rotational axis 38, 39 essentially correspond to the longitudinal axis of the tie rod 9 and the lock nut 10. The connecting pieces 24 of the first mechanical actuating member 20 and the connecting pieces of the second mechanical actuating member 30 are then brought into the closed position shown with dashed lines on FIG. 3, after which the tool 7 is moved in the direction of the longitudinal axis of the tie rod 9 to the lock nut 10, so that the second contact surface 31 is thereby engaged as the complementary hexagon to the hexagon 12 on the lock nut 10. The actuator 32 is then used to impart a rotational movement around the second rotational axis 39 to the second mechanical actuating member 30, i.e., the partial ring 41 and the two connecting pieces (not shown), thereby releasing the lock nut 10.

The robot 1 then moves the tool 7 in the direction of the longitudinal axis of the tie rod 9 and lock nut 10, which are coaxial and identical, in the direction toward the positive geometry 13 as the hexagon 14 on the tie rod 9 until the first contact surface 25 of the first mechanical actuating member 20 is positively joined with the hexagon 14 on the tie rod 9. The actuator 27 then imparts a rotational movement around the first rotational axis 38 to the first mechanical actuating member 20, i.e., the partial ring 41 and two connecting pieces 24 in the closed position, until the track of the wheel has been set in a correspondingly proper manner. The rotational angle of the first mechanical actuating member 20, and thus also the rotational angle of the tie rod 9, is calculated by the control unit 35 as a function of the positions of the two steered wheels of the motor vehicle acquired by the measuring system (not shown). The robot 1 then similarly again moves the tool 7 in a translational movement along the longitudinal axis of the tie rod 9 back to the lock nut 10, until the second mechanical actuating member 30 is positively joined with the positive geometry 11 on the lock nut 10.

The actuator 32 is thereupon activated, and turns the second mechanical actuating member 30 in a rotational direction opposite the rotational direction for detaching the lock nut 10, thereby fixing the lock nut 10 in place again. The connecting pieces 24 of the first mechanical actuating member 20 and the connecting pieces of the second mechanical actuating member 30 can then be moved out of the opening 22 again and into an open position inside of the housing 19, so that, in a side view as depicted on FIG. 3, the connecting pieces 24 are located inside of the housing 19, and thereby are essentially no longer visible. As a result, the tool 7 can again be moved away from the tie rod 9 and lock nut 10 by the robot 1 by moving the tie rod 9 and lock nut 10 out of the opening 37 on the housing 19. In the open position of the connecting pieces 24, the tool 7 is thus designed similarly to a fork wrench, so that the tie rod 9 and lock nut 10 can be moved into this fork wrench, i.e., through the opening 37 of the housing 19, and vice versa.

Deviating from the approach described above, the tool 7 can be first be moved by the robot 1 not to the neutral section 15, but first to the lock nut 10 for detaching the lock nut 10, and then moved to the positive geometry 13 of the tie rod 9, and thereupon back to the lock nut 10 again for tightening the lock nut 10. A translational movement of the tool 7 is not necessary if the axial distance between the first and second mechanical actuating members 20, 30 essentially corresponds to the axial distance between the positive geometry 11 of the lock nut 10 and positive geometry 13 of the tie rod 9.

The robot 1 exhibits sensors (not shown) for acquiring the torque applied by the first and second mechanical actuating members 20, 30 and/or for acquiring the rotational angle position of the first and second mechanical actuating members 20, 30 and/or for acquiring the position of the tie rod 9 and/or lock nut 10 in the opening 37. The robot 1 and tool 7 are additionally controlled as a function of the data provided by these sensors. For example, if the rotational angle position of the partial ring 21 is such that the latter cannot be slipped onto the hexagon 11 of the tie rod 9, the actuator 27 is used to turn the partial ring 21 so that the hexagon 14 on the tie rod 9 is correspondingly aligned to the square on the partial ring 21 or to the hexagon of the first contact surface 25 in a closed position of the connecting pieces 24 as denoted by the dashed line on FIG. 3. The same also holds true analogously for the second mechanical actuating member 30.

Viewed overall, significant advantages are associated with the robot 1 according to the invention. The partial ring 21 comprising a greater part or main part 26 of the first contact surface 25 is simply formed by the interior side of the partial ring 21, which makes it especially easy and inexpensive to manufacture. Since just one component is here involved, a greater part of the torque can thus also be applied to the lock nut 10 in an especially reliable manner. The robot 1 with the tool 7 is thus inexpensive to manufacture, and especially reliable during operation for setting the track of the wheels.

Figure 5A:
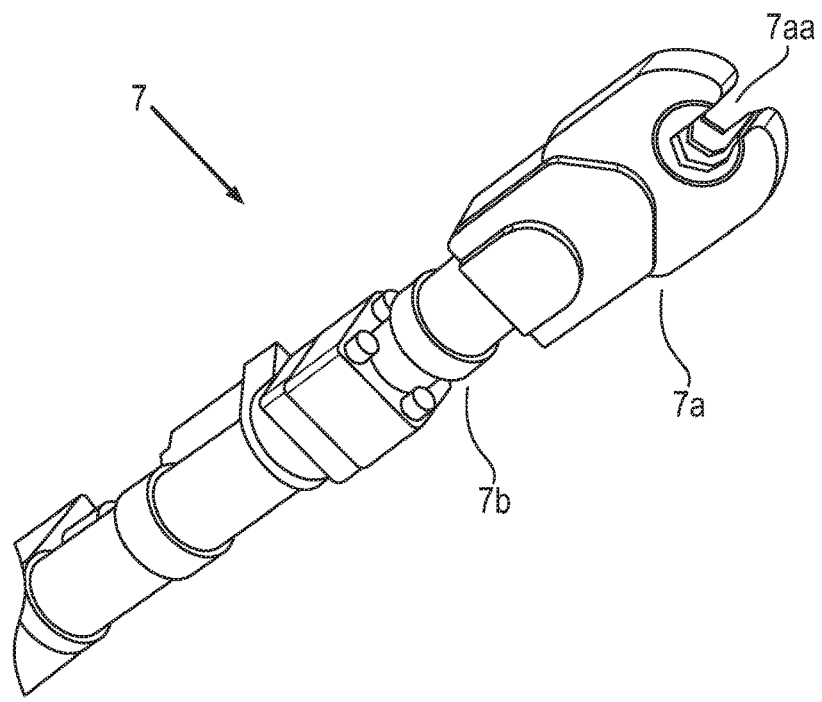
FIG. 5a is a perspective view of a first embodiment of a tool.
Figure 5B:
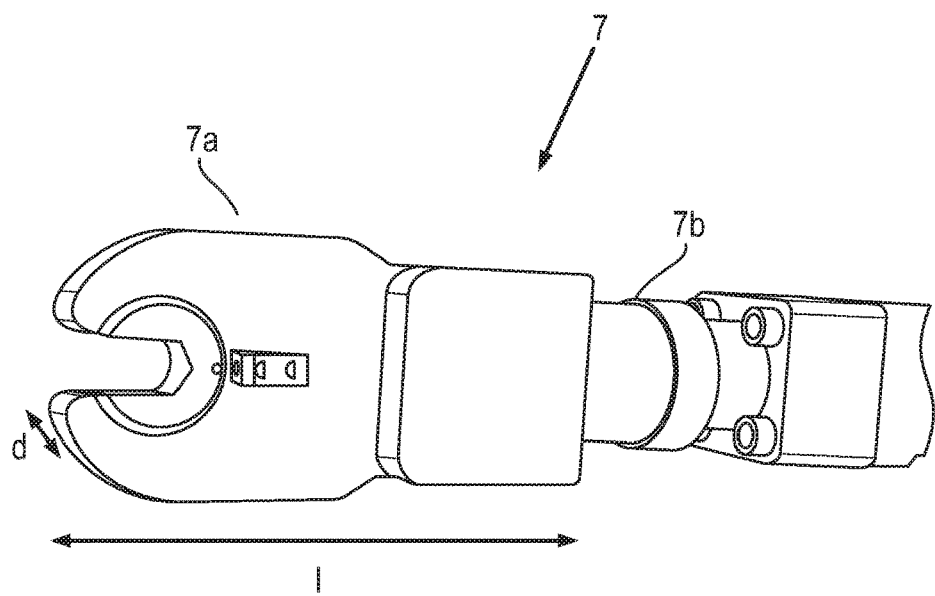
FIG. 5b is a perspective view of a second embodiment of a tool.

FIGS. 5a and 5b show a perspective view of two embodiments of a tool 7. As evident from the figures, each tool 7 is composed of a tool head 7a, into which a slotted opening 7aa for receiving a tie rod extends, along with a tool shaft 7b. The respective tool head 7a is flat, i.e., approximately disk-shaped, in structure. For this reason, the tool head 7a can be guided tightly along the bearing head 17 shown on FIG. 1 during operation, so as to engage the locked nut 10 of the tie rod 9 via the slotted opening 7aa.

The tool 7 itself does not incorporate any active elements, such as a drive, etc., so that the tool head 7a and tool shaft 7b can be given a small design. The tool 7 is thus controlled and moved exclusively by controlling and moving the robot arm 1, to which the tool 7 is fastened. Due to this configuration, the tool can be exchanged quickly and easily.

At least one exemplary embodiment was described, wherein it must be remembered that a high number of variants thereto exists. It should also be borne in mind that the exemplary embodiment or exemplary embodiments are only examples, and hence are not intended to in any way limit the protective scope, applicability or implementability or structural design. The above description provides the expert with a suitable instruction for implementing at least one exemplary embodiment. Let it be understood that various changes can be made in the function and arrangement of the described components in an exemplary embodiment without deviating from the protective scope of the following claims and the equivalents of the following claims.

The invention claimed is:

1. A robot comprising:
a movable robot arm;
at least one actuator for moving the robot arm;
a tool having a tool head and disposed remote from the robot arm, wherein the tool head comprises:
a housing defining an inside and having a front end defining a slotted opening that opens into the inside of the housing, the slotted opening configured to receive a tie rod;
a first mechanical actuating member including a first actuator configured to rotate around a first rotational axis and configured to turn the tie rod, the first mechanical actuating member disposed in the housing;
a second mechanical actuating member including a second actuator configured to rotate around a second rotational axis and configured to turn a lock nut on the tie rod, the second mechanical actuating member disposed in the housing; and
a tool shaft joining the tool head with the robot arm;
wherein the tool head is configured to set a track of a wheel by turning the tie rod;
wherein the first and second mechanical actuating members with the first and second actuators are configured to rotate independently of one another;
wherein the tool head has a tool head thickness that measures no greater than 20% of a length of the tool head from the front end to a connection with the tool shaft.

2. The robot according to claim 1, wherein the tool comprises:
a first contact surface of the first mechanical actuating member that is configured for placement on a positive geometry of the tie rod, wherein a main part of the first contact surface is fixed in terms of a radial movement relative to the first rotational axis.

3. The robot according to claim 2, wherein the first mechanical actuating member and the second mechanical actuating member are configured as a single tool with the inside of the hosing defined as a rectangular, unitary space.

4. The robot according to claim 2, wherein the first mechanical actuating member is configured to preclude a radial movement by the main part of the first contact surface relative to the first rotational axis.

5. The robot according to claim 2, wherein the main part of the first contact surface comprises a U-shaped member having a complementary geometry for positively applying a torque to the positive geometry of the tie rod.

6. The robot according to claim 5, wherein the complementary geometry of the main part is configured as a square for applying the torque.

7. The robot according to claim 2, wherein the main part of the first contact surface is configured on a partial ring that defines a receiving opening for introducing the positive geometry of the tie rod, wherein an interior side of the partial ring forms the main part of the first contact surface.

8. The robot according to claim 2, wherein the main part of the first contact surface comprises at least 50% of the first contact surface.

9. The robot according to claim 2, wherein the main part of the first contact surface exclusively rotates around the first rotational axis.

10. The robot according to claim 9, further comprising an additional part of the first contact surface that is moveable in terms of a radial movement relative to the first rotational axis.

11. The robot according to claim 1, wherein the tool further comprises:
the first actuator and a first gear wheel configured to turn mechanism for turning the first mechanical actuating member around the first rotational axis, the first actuator and the first gear wheel disposed in the inside of the housing; and
the second actuator and a second gear wheel configured to turn the second mechanical actuating member around the first rotational axis, the second actuator and the second gear wheel disposed in the inside of the housing.

12. The robot according to claim 1, wherein the tie rod extends in a longitudinal direction, wherein the tool further comprises:
a first partial ring in the first mechanical actuating member that defines a first receiving opening configured to receive a first positive geometry of the tie rod, wherein the first partial ring is configured to move to a closed position around the tie rod, and wherein the first partial ring is configured to rotate the tie rod; and
a second partial ring in the second mechanical actuating member that defines a second receiving opening configured to receive a second positive geometry of the lock nut, wherein the second partial ring is configured to move to a closed position around the tie rod, and wherein the second partial ring is configured to rotate the lock nut;
wherein the tool is configured to:
translate in the longitudinal direction along the tie rod between the first and second positive geometries with the first and second partial rings closed and the tie rod disposed in the first and second receiving openings; and
rotate the tie rod and the lock nut independent of one another while fixed in one position.

13. The robot according to claim 1, wherein the first mechanical actuating member and the second mechanical actuating member are configured coaxially to each other, and are configured to rotate independently, wherein the housing defines the tool head as a single-headed tool.

14. The robot according to claim 1, wherein the tie rod extends in a longitudinal direction between a bearing head and a covering, and wherein the first and second mechanical actuating members include first and second partial rings respectively, that are configured to move into respective closed positions around the tie rod, after which the tool is configured to move in a direction of the longitudinal axis of the tie rod between the lock nut and a positive geometry for rotating the tie rod.

15. The robot according to claim 1, wherein the robot further comprises a control unit for controlling the movement of the robot arm and for actuating the tool.

16. The robot according to claim 15, wherein the robot further comprises an optical system having a camera for optically acquiring the position of the lock nut and tie rod.

17. The robot according to claim 1, wherein the inside of the housing is open between the first and second mechanical actuating members so that the first and second mechanical actuating members face each other without barriers.

18. The robot according to claim 17, wherein the inside of the housing contains first and second gear wheels in the first and second mechanical actuating members, respectively and first and second actuators engaging the first and second gear wheels, respectively, in a unitary space.

19. The robot according to claim 18, wherein the tie rod extends in a longitudinal direction, wherein the tool further comprises:
- a first partial ring in the first mechanical actuating member that is engaged by the first gear wheel and that defines a first receiving opening configured to receive a first positive geometry presented by the tie rod, wherein the first partial ring is configured to move to a first partial ring closed position around the tie rod, and wherein the first partial ring is configured to rotate the tie rod; and
- a second partial ring in the second mechanical actuating member that is engaged by the second gear wheel and that defines a second receiving opening configured to receive a second positive geometry presented by the lock nut, wherein the second partial ring is configured to move to a second partial ring closed position around the tie rod, and wherein the second partial ring is configured to rotate the lock nut;

wherein the tool is configured to:
- translate in the longitudinal direction along the tie rod between the first and second positive geometries with the first partial ring in the first partial ring closed position and with the second partial ring in the second partial ring closed position while the tie rod is disposed in the first and second receiving openings, when the first and second positive geometries are spaced apart a first distance; and
- rotate the tie rod and the lock nut independent of one another while fixed in one position, when the first and second positive geometries are spaced apart a second distance that is less than the first distance.

* * * * *